United States Patent [19]

Grinstead

[11] Patent Number: 4,755,298
[45] Date of Patent: Jul. 5, 1988

[54] PROCESS FOR REMOVING BORON IONS FROM AQUEOUS SOLUTIONS

[75] Inventor: Robert R. Grinstead, Walnut Creek, Calif.

[73] Assignee: The Dow Chemical Company, Midland, Mich.

[21] Appl. No.: 937,768

[22] Filed: Dec. 4, 1986

[51] Int. Cl.$^4$ ............................................. B01D 13/00
[52] U.S. Cl. ................................... 210/638; 210/641; 210/651; 210/902
[58] Field of Search ............... 210/634, 638, 639, 651, 210/902, 641

[56] References Cited

U.S. PATENT DOCUMENTS

| | | | |
|---|---|---|---|
| 2,813,838 | 11/1957 | Lyman et al. | 210/902 |
| 3,519,558 | 7/1970 | Cooper et al. | 210/639 |
| 3,567,369 | 3/1971 | Chemtob | 423/277 |
| 3,969,239 | 7/1976 | Shinohara et al. | 210/735 |
| 4,031,038 | 6/1977 | Grinstead et al. | 423/24 |
| 4,089,778 | 5/1978 | Gauger | 210/638 |
| 4,405,576 | 9/1986 | Lee et al. | 423/181 |
| 4,415,678 | 11/1983 | Lee et al. | 521/28 |

FOREIGN PATENT DOCUMENTS

| | | |
|---|---|---|
| 44872 | 9/1985 | European Pat. Off. |
| 2135983 | 9/1984 | United Kingdom |
| 785321 | 12/1980 | U.S.S.R. |
| 1122644 | 11/1984 | U.S.S.R. |

OTHER PUBLICATIONS

R. Kunin et al. *I&EC Product Research & Development*, V3, p. 305, 1964, "Characterization of a Boron-Specific Ion Exchange Resin", Philadelphia.
C. L. Mehltretter, *I&EC Product Research and Development*, V6, p. 145, 1967, "Boron-Selective Ion Exchange Resins Containing D-Glucitylamino Radicals", Peoria, Ill.
P. R. Klinkowski, "Ultrafiltration", *Kirk-Othmer Encyclopedia of Chemical Technology*, V23, pp. 439-461, 1983 John Wiley & Sons, NY.
E. F. Leonard, "Dialysis", *Kirk-Othmer Encyclopedia of Chemical Technology*, V7 (3rd Ed), pp. 564-579, John Wiley & Sons, NY.

*Primary Examiner*—Peter Hruskoci

[57] ABSTRACT

The present invention relates to a cyclic continuous process for the removal of boron ion from aqueous streams. An aqueous stream in contacted with an aqueous solution of a water-soluble organic polymeric chelant. The boron ion is absorbed and chelated. The separation of water and smaller molecules is accomplished by separation means such as ultrafiltration or dialysis. The concentrated aqueous solution is then treated with dilute aqueous mineral acid, followed by the released boron. The chelant is then recycled and reused. Preferred chelants are polymers having pendant N-alkylglucamine or derivative thereof or trihydroxyalkylamines or derivatives thereof. A preferred chelant is N-methylglucamine attached to a commercial FIBRABON 35 polymer using a -2-hydroxypropyl linkage. Additional preferred embodiments are those polymers having trihydroxymethyl amine in the pendant group attached to a FIBRABON 35 polymer backbone. The process is useful to remove toxic boron from agricultural water, industrial waters, waste-water sewage, oil well brine, and the like.

20 Claims, 2 Drawing Sheets

PROCESS FOR REMOVING BORON IONS FROM AQUEOUS SOLUTIONS

BACKGROUND OF THE INVENTION

1. Field of the Invention

This invention relates to a process wherein an aqueous solution comprising boron ions in solution is treated with a water soluble polymeric chelant to coordinate with the boron ions. Water and low molecule-weight materials are separated from the boron-containing polymeric chelate by separation means such as dialysis or ultra-filtration. The chelate is then subjected to acid treatment which removes the boron-containing ion, and the chelate and ion are separated. The polymeric chelant is then recycled and reused.

2. Description of the Art

In Soviet Union Pat. No. 1122644 (dated Nov. 7, 1984), M. I. Yakushkin et al. disclose that N-beta-hydroxyethyl glucamine is used as a starting material for the synthesis of a boron-selective sorbent. The glucamine is added to the chloromethylated cross-linked copolymer of styrene and divinylbenzene to form a water-insoluble polymer. This reference does not teach the use of a water-soluble polymer.

J. Nomura et al. in Great Britain Pat. No. 2,135,983 disclose the separation of borate ions from water at pH of 5-11 by contacting the aqueous borate-containing solution with an absorbent comprising hydroxides or hydrated oxides of rare earth elements and preferably contacting the absorbent containing the absorbed borate ions with a desorption solution of pH of 2 to 4 or pH 12 to 14 to desorb the borate ions and regenerate the absorbant.

N. B. Galitskaya in Soviet Union Pat. No. 785,321 discloses a boron-selective sorbent by the amination of halogenated cross-linked vinyl copolymer with tris-hydroxymethyl amino-methane.

A solid-phase cation-exchange resin for the removal of unwanted ions is brine, including borate, is described by J. M. Lee et al. in U.S. Pat. No. 4,415,678 and No. 4,405,576.

M Kurihara et al. disclose on European Pat. No. 44872 a technique for selectively separating water-soluble materials such as borate from aqueous solutions using reverse osmosis membrane having a porous, support-carrying barrier layer of cross-linked isocyanurate polymer.

In U.S. Pat. No. 2,813,838, W. R. Lyman et al. disclose a boron-absorbing resin and a process for removing boron compounds from liquids. R. Kunin et al. disclose in *I & EC Product Research & Development*, Vol. 3, p. 305 (1964), a characterization of a boron-specific ion exchange resin. C. L. Mehltretter et al. describe boron-selective ion exchange resins containing D-glucitylamino radicals in *I & EC Product Research & Development*, Vol. 6, p. 145 (1967). E. M. Chemtoh in U.S. Pat. No. 3,567,369 disclose an ion exchange resin for removing borates from brine. All of these processes are concerned with an ion-exchange resin which is insoluble in water.

It is known by a number of techniques to treat an aqueous solution with a water-insoluble ion exchange resin. However, the problems associated with this approach include a kinetic performance that is fairly slow and a complicated process to prepare the water-insoluble polymer. It is therefore very desirable to have a process where the organic chelant is water-soluble to react quickly with the boron ion in one phase, and remains in solution during separation using dialysis or the like. Further, the polymeric chelant is recyclable and may be reused again and again.

SUMMARY OF THE INVENTION

The present invention relates to an improved process for the removal of boron-containing ions from a fluid stream comprising boron-containing ions, which process comprises:

(A) contacting the fluid stream in a contacting zone with an aqueous reaction solution at between about 10° C. and 90° C. for a time sufficient to chelate the boron-containing ions, the reaction solution itself comprising an effective amount of a water-soluble organic polymeric chelant to chelate the boron ion present selected from organic polymeric chelants of the formula:

wherein R in each unit of the polymer is independently selected from —H or a substituent selected from:

CHOH—CHOHCH₂OH wherein R₁ is alkyl having from 1 to 10 carbon atoms; or $$-CH_2-CH(OH)CH_2-NH-C(CH_2OH)_3;$$

and n is an integer between about 5 and 20,000;

wherein R₂ in each unit of the polymer is independently selected from —OH, —Cl, or a substituent:

wherein R₁ is alkyl having from 1 to 10 carbon atoms, or and n is an integer between about 5 and 20,000;

wherein R₃ in each unit of the polymer is independently selected from —OH, —OR'₁, or a substituent:

and $R_1$ and $R'_1$ are each independently alkyl having from 1 to 10 carbon atoms; or

—NH—C(CH$_2$OH)$_3$;

and t is an integer between about 10 and 20,000;

$-(CH_2-CH-)_y-$
   |
   (phenyl)
   |
   CH$_2$—R$_4$
(iv)

wherein $R_4$ in each unit of the polymer is independently selected from —OH, —Cl or a substituent:

$R_1-N-CH_2-CHOH-CHOH-CHOH-CHOH-CH_2OH$ and $R_1$ is alkyl having from 1 to 10 carbon atoms; or

—NH—C(CH$_2$OH)$_3$;

and y is an integer between about 10 and 20,000;

$-[N-C-(CH_2)_a-C-N-(CH_2CH_2-N)_b-CH_2CH_2]_x-$
(v)

wherein $R_5$ in each unit of the polymer is independently selected from —CH$_2$CH(OH)CH$_2$OH; —CH$_2$CH(OH)CH$_2$Cl; or —CH$_2$—CH(OH)CH$_2$
                |
        $R_1$—N—CH$_2$—CHOH—CHOH—
CHOH—CHOHCH$_2$OH wherein $R_1$ is alkyl having from 1 to 10 carbon atoms, or from —CH$_2$CH(OH)CH$_2$OH; —CH$_2$CH(OH)CH$_2$Cl; or —CH$_2$CH(OH)CH$_2$—NH—C(CH$_2$OH)$_3$; where x is between about 10 to 10,000, a is 6, and b is 1 to 4;

$-[CH_2CH_2-C-N(CH_2CH_2-N)_m]_x-$
(vi)

$R_6$ in each polymer unit is independently selected from —H, or

—CH$_2$—CH(OH)CH$_2$
                |
        $R_1$—N—CH$_2$—CHOH—CHOH—
CHOH—CHOHCH$_2$OH wherein $R_1$ is alkyl having from 1 to 10 carbon atoms; or from —H or —CH$_2$CH(OH)CH$_2$—NH—C(CH$_2$OH)$_3$; m is 1 to 4, and x is 5 to 20,000;

(vii)

wherein $R_7$, $R_8$, and $R_9$ in each polymer unit are each independently selected from $R_5$ as is defined hereinabove, and w is between about 10 to 10,000; with the proviso that the overall ratio of H to substituent in R, —OH or —Cl to other substituent in $R_2$, —OH or OR'$_1$ to other substituent in $R_3$, OH or —Cl to other substituent in $R_4$, —CH$_2$CH(OH)CH$_2$OH or —CH$_2$CH(OH)CH$_2$Cl to other substituent in $R_5$, H to other subsituent in $R_6$, —CH$_2$CH(OH)CH$_2$OH or —CH$_2$CH(OH)CH$_2$Cl to other substituent in $R_7$, —CH$_2$CH(OH)CH$_2$OH or —CH$_2$CH(OH)CH$_2$Cl to other substituent in $R_8$, and —CH$_2$CH(OH)CH$_2$OH or —CH$_2$CH(OH)CH$_2$Cl to other substituent in $R_9$ in each organic polymeric chelant described hereinabove is between about 10/90 and 90/10;

(B) treating the aqueous solution produced in step (A) by first means effective to remove water and other monomeric reaction products from the aqueous solution;

(C) contacting the concentrated aqueous solution produced in step (B) with a mineral acid under conditions effective to release the boron from the chelate;

(D) removing the released boron ion by second means effective to separate the released boron ion;

(E) recycling the concentrated aqueous solution containing chelant substantially free of boron ion from step (D) to the contacting zone of step (A).

In a preferred embodiment, the organic polymeric chelant is

In one preferred embodiment the pendant group contains N-methyl glucamine.

In another preferred embodiment the pendant group contains trihydroxymethyl amine.

Each of the chelants described above (i.e., chelate (i) to (vii)) are each independently preferred.

DETAILED DESCRIPTION AND PREFERRED EMBODIMENTS

This present separation process is useful for removing boron ion from several types of aqueous (or fluid) solutions. In some cases, normal ground water contains boron ion in amounts which are excessive for agricultural uses, i.e., boron levels in excess of about 0.5 ppm. As used in the present invention, the term "boron", "boron-containing ion" or "boron ion" refers to borates having charged ions and also to uncharged species, e.g. boric acid. Boron ion also occurs in various wastewaters, such as sewage, geothermal brine, oil well brine and agricultural drainage.

Water-Soluble Polymeric Chelants

Any otherwise inert water-soluble polymeric chelant capable of chelating the boron ion is suitable in the present process. "Inert" in this context is defined as not detrimentally reactive in the process to an impermissive extent. Polymeric chelates having a molecular weight of between about 500 and 1,000,000 daltons are preferred, and a molecular weight between 1,000 and 500,000 are more preferred.

Those water-soluble polymers having a backbone chain with pendant groups capable of chelating boron ions are preferred. The more preferred water-soluble polymeric chelants (having pendant-chelating groups) include, for example, those repeating polymeric groups described hereinabove in the SUMMARY.

A more detailed description of the preparation for these various organic polymeric chelates is provided below and as part of the Examples. Some polyamines and polyethers used in synthesis are described in Table 1 below.

TABLE 1
POLYAMINES USED AS STARTING MATERIALS FOR POLYCHELATOR SYNTHESIS

| Amine[a] | Degree of Polym. (D.P.) | Molecular Weight Range | Nature of Chain |
|---|---|---|---|
| E-100[b] | 6 | 250–300 | Branched |
| PEI-6 | 15 | 600 | Branched |
| Hydrolyzed PEOx | 50[c] | 2000 | Linear |
| Purifloc C-31[d,e] | 500 | 10,000–30,000 | Branched |
| Hydrolyzed PEOx | 500[f] | 20,000 | Linear |
| PEI-600 | 1500 | 60,000 | Branched |
| Hydrolyzed PEOx | 5000[g] | 500,000 | Linear |

[a]PEI = polyethyleneimine; PEOx, polyethyloxazoline. PEI is a polymer of molecular weight 60,000 (CORCAT 600) and is obtained from Cordova Chemical Company. The nitrogen content is determined by drying a sample, and elemental analysis of the solid.
[b]E-100 - is a byproduct of ethylenediamine manufacture and is a low molecular weight branched polymer containing about six ethyleneamine groups.
[c]100% hydrolyzed
[d]Purifloc C-31 - is a polyethylene amine product of the Dow Chemical Company, Midland, Michigan.
[e]Probably also partially crosslinked.
[f]85% hydrolyzed
[g]97% hydrolyzed The water-soluble polymeric chelants are produced according to the Preparations and Examples described hereinbelow.

Some chelants of the present invention have a —CH$_2$CH(OH)CH$_2$— in the pendant group. In the N-alkyl glucamine embodiment, N-alkyl glucamine is reacted with epichlorhydrin, to produce ClCH$_2$CH(OH)CH$_2$—N(R)CH$_2$(CHOH)$_4$CH$_2$OH, which is subsequently reacted with —N—H in or attached to the polymer backbone in the presence of strong base. Other chelants of the present invention have a trihydroxymethyl methylamine attached to a —CH$_2$CH(OH)CH$_2$— linkage. In this embodiment, the NH$_2$C(CH$_2$OH)$_3$ is reacted with epichlorohydrin to produce Cl—CH$_2$CH(OH)CH$_2$—NHC(CH$_2$OH)$_3$, which is subsequently reacted with an —N—H in or attached to the polymer backbone in the presence of strong base.

One embodiment of chelant (i), $\{CH_2-CH_2-N(R)\}_m$, is where R is —H or —CH$_2$CH(OH)CH$_2$N(CH$_3$)CH$_2$(CHOH)$_4$CH$_2$OH. This chelant is prepared by dissolving polyethylenimine (CORCAT 150 or CORCAT 600 available from the Cordova Chemical Company) in water followed by reaction with the adduct formed by the reaction of epichlorhydrin and N-methylglucamine in base to remove hydrogen chloride. Another embodiment of Chelant (i) is where R is —H or —CH$_2$CH(OH)CH$_2$HNC(CH$_2$OH)$_3$, which is also prepared by reaction of polyethylenimine with the adduct formed by the reaction of epichlorhydrin and tris(hydroxymethyl)methylamine. Generally the ratio of —H to substituent in R is between about 10/90 to 90/10 in the chelant. A preferred ratio is between about 10/90 and 40/60.

A polymeric chelant such as the one designated (ii) where R$_2$ is —OH, —Cl or N-methylglucamine is obtained by reacting polyepichlorhydrin with N-methylglucamine in the presence of a strong base such or aqueous sodium hydroxide to remove the hydrogen chloride produced. Generally the ratio of —OH or —Cl to substituent is between about 10/90 and 90/10. A preferred ratio is between about 10/90 and 40/60.

An embodiment of the polymeric chelant designated (iii) where R$_3$ is is obtained by reacting poly(methyl acrylate) with N-methyl glucamine. Poly(methyl methacrylate) from Polysciences, Inc., Warrington, Pa. having a molecular weight of between about 1000–100,000 is preferred. Generally, the ratio of —OH or OR$'_1$ to substituent in R$_3$ is between 10/90 and 90/10 in the chelant. A preferred ratio is between about 10/90 and 40/60.

A chelant designated (iv) is obtained by the reaction of poly(vinylbenzylchloride) with N-methylglucamine in the presence of strong aqueous base to remove the HCl formed. Generally the ratio of —OH or —Cl to substituent is between about 10/90 and 90/10. A preferred ratio is between about 10/90 and 40/60.

An embodiment of the chelant designated (v) is obtained by reacting a polymer of adipic acid and diethylenetriamine with the adduct formed by the reaction of equimolar amounts of N-methylglucamine and epichlorhydrin. Strong aqueous base is used to remove HCl formed. Generally, the ratio of —CH$_2$CH(OH)CH$_2$OH, or —CH$_2$CH(OH)CH$_2$Cl to substituent in R$_5$ is between 10/90 and 90/10 in the chelant. A preferred ratio is between about 10/90 and 40/60.

An embodiment of the chelant designated (vi) is to start with the polymer formed in the reaction of ethylenediamine, and methyl acrylate, such as KYMENE 557H is available from the Hercules Corporation of Wilmington, Del. having a molecular weight of about 30,000 daltons. The adduct of epichlorhydrin and N-methylglucamine as described in Preparation A below is added in excess and in the presence of strong aqueous base to remove the HCl generated. Generally, the ratio of $-CH_2CH(OH)CH_2OH$ or $-CH_2CH(OH)CH_2Cl$ to substituent in $R_6$ is between 10/90 and 90/10 in the chelant. A preferred ratio is between about 10/90 and 40/60.

A preferred embodiment of the chelant designated (vii) is the polymer where $R_7$, $R_8$ and $R_9$ are selected from $-CH_2-CH(OH)CH_2OH$ or $CH_2-CH(OH)CH_2Cl$ or $-CH_2CH(OH)CH_2N(CH_3)CH_2-(-CHOH)_4CH_2OH$. FIBRABON 35 obtained from the Diamond Shamrock Company (of Cleveland, Ohio) having pendant chloromethyl groups which are reacted with aqueous N-methylglucamine in the presence of aqueous base to remove the hydrogen chloride formed. Generally, the ratio of $-CH_2CH(OH)CH_2OH$ or $-CH_2CH(OH)CH_2Cl$ to substituent in each of $R_7$, $R_8$ or $R_9$ is between 10/90 and 90/10 in the chelant. A preferred ratio is between about 10/90 and 40/60.

In the preparation of the above chelants, the pendant group is attached to an active atom on the backbone of the polymer chain. Not all of the active groups react to form a pendant group.

Two-Step Process for Removing Boron from Aqueous Solutions

Figures 1, 2, 3:
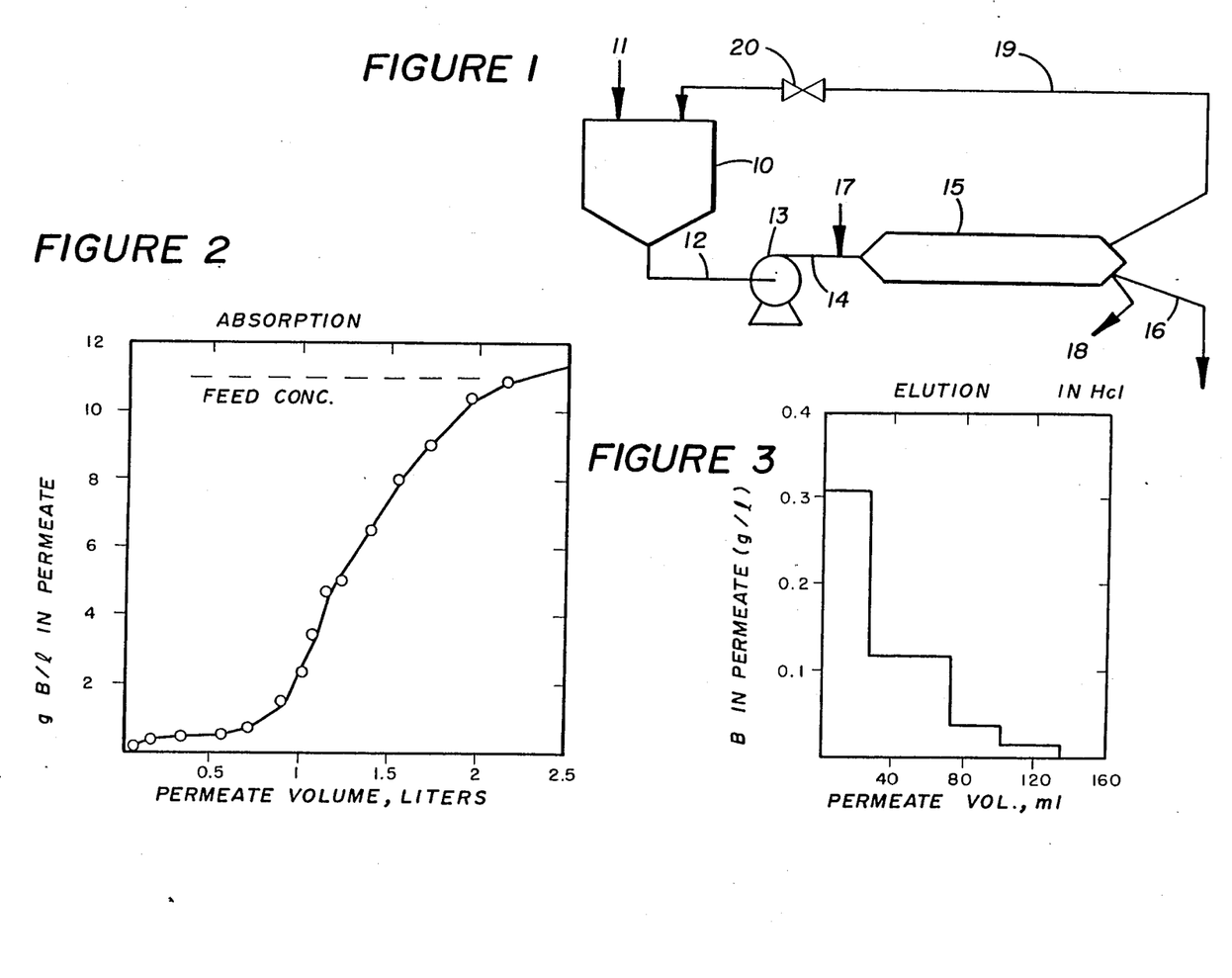
FIG. 1 illustrates a process wherein a boron ion containing solution is contacted with a water-soluble organic polymeric chelant to chelate the boron ion, remove water, regenerate the boron ion, separate the boron ion, and recycle the polymeric chelant. The process eliminates the environmental pollution problem associated with the discharge of the aqueous stream containing toxic or noxious levels of boron ion.
FIG. 2 shows the boron absorption by N-methylglucamine/FIBRABON 35 polymeric chelate with time.
FIG. 3 shows the elution of boron from N-methylglucamine/FIBRABON 35 polymeric chelate as a function of the volume of 1N hydrochloric acid.

With regard to FIG. 1, feed solution in line 11 containing boric acid or a borate salt is obtained and added to vessel 10, which contains a solution of the water-soluble chelating polymer of concentration about 0.1% to about 25%, preferably between about 0.5% and 10%. This solution is mixed and transmitted via line 12, pump 13, and line 14 to an ultrafiltration cell 15, having an ultrafilter membrane or a dialysis membrane having a molecular weight cut off less than the chelate polymer molecular weight. The process is usually accomplished by recirculating the mixture through a membrane device, with a throttle valve 20 used to maintain a pressure of between about 10 and 200 psi, preferably between about 25 and 100 psi, in the membrane unit and a reservoir. The aqueous solution which permeates through the porous membrane is collected as an effluent which is essentially free of boron ion (line 16). Water can also be added at line 11 or line 17 to maintain liquid volume.

After the chelating polymer combines with available boron ion and boron ion begins to appear in the aqueous permeate in line 16, the feed is discontinued and is replaced with a dilute mineral acid stream in line 17, preferably hydrochloric acid, sulfuric acid, nitric acid, and the like. The concentration is from between about 0.1N to 6N, preferably 1-2N. This aqueous acid treatment liberates the boron from the polymeric chelate-boron complex so that boron-ion, e.g., boric acid is free to permeate through the porous membrane at 15 and be collected in line 16 or optionally line 18. The solution is circulated until the removal process of boron is complete and the water-soluble polymeric chelant is recycled for reuse to vessel 10 via line 19. Valve 20 is simply used to adjust the rate of the transfer.

The temperature of the aqueous feed solutions and aqueous polymeric chelate are between 0° and 100° C., preferably between about 10° and 90° C., and more preferably between about 15° and 50° C. The pH of the aqueous solution is generally between about 1 and 10, preferably between about 5 and 9. Boron levels in the feed solution may be any amount up to about 0.1 of the equivalent molar concentration of the polymeric chelant in the cell. Preferably, the boron ion concentration will be less than about 100 mg/liter.

Other constituents of the aqueous feed solution may include inorganic salts of various types and organic compounds whose molecular weight is generally no larger than about one-tenth of the molecular weight (MW) cut off value of the porous membrane. Preferably a molecular weight cut off is about 500 daltons, and more preferably about 1000 daltons. The lower molecular weight materials up to 500 MW (preferably 1000 MW) will be removed from the chelate containing solution by passing through the membrane.

Example 7 below describes the removal of boron from a synthetically created "waste water" sample. Example 8 describes the removal of boron from an oil well brine. The results are representative and comparable.

In Runs 1, 2 and 3 of Example 8, boron capacity appears to be predictable. Where the permeation cell contained about 0.5 millimole of active N-methylglucamine (NMG), about 2–2.5 milligrams 0.25–0.5 millimoles of boron were absorbed, equivalent to about 0.5 millimole of boron per millimole of NMG.

At least two advantages of the present invention are observed over the water-insoluble polymers of the art. First, the kinetic performance of the water-soluble system is faster than that of water-insoluble resin, since the reactions occur in a single phase. Second, preparation of the water-soluble polymer is considerably simpler than the preparation of the water-insoluble resin, since it can be conducted in a single phase such as water.

The following Examples are to be construed as being illustrative only and are not to be limiting in any way.

PREPARATION A 19.5 Grams (0.1 mole) of N-methyl glucamine (Aldrich Chemical Co., Milwaukee, Wis.) dissolved in 150 ml of water. To this solution is added 0.12 mole of epichlorhydrin (Aldrich Chemical Co., Milwaukee, Wis.) about a 20% excess. After allowing the solution to stir for an hour at ambient temperature, it is extracted twice with 50 ml of methylene chloride to remove the unreacted epichlorhydrin. The aqueous phase containing the $ClCH_2CH(OH)CH_2$-compound is used immediately.

PREPARATION B 12.1 Grams (0.1 mol) of tris(hydroxymethyl)methylamine (from Aldrich Chemical Co.) is dissolved in 125 ml of water. To this solution is slowly added about 0.12 mole (a 20% excess) of epichlorhydrin (Aldrich Chemical). After stirring for one hour at ambient temperature, the solution is extracted twice using 50 ml of methylene chloride to remove the unreacted epichlorhydrin. The aqueous phase containing the reactive Cl-compound is used immediately.

EXAMPLE 1

Preparation of Polymeric Chelate (i)

Based on Polyethyleneimine (PEI)

(CHELATE A):
R=—H or —CH$_2$CH(OH)CH$_2$—N(CH$_3$)—CH$_2$—(CHOH)$_4$CH$_2$OH, n=1500

(a) Polyethyleneimine, 11 g [degree of polymerization 1500] is dissolved in 200 ml of water to produce a solution of 1.25 molar (in amine nitrogen). To the aqueous solution is added the chloride compound of Preparation A (76 g, a 5% excess) with stirring while maintain the reaction mixture at about 60° C. A pH electrode is used to monitor the reaction, and 50% sodium hydroxide is added to keep the pH about 10. After 50 minutes the reaction is complete, and the reaction mixture is allowed to cool. The aqueous solution is diluted to 1.0M (amine nitrogen) and used to chelate boron ion without further purification.

(b) (CHELATE B):
R=—H or —CH$_2$CH(OH)CH$_2$NH—C(CH$_2$OH)$_3$, n=1500

In a similar manner as is described above in Example 1(a), the reaction is performed except that a stoichiometrically equivalent amount of ClCH$_2$CH(OH)CH$_2$NHC(CH$_2$OH)$_3$ is used instead of ClCH$_2$CH—(OH)CH$_2$—N(CH$_3$)—CH$_2$(CHOH)$_4$CH$_2$OH. There is obtained a corresponding amount of active polymer which is used to chelate boron ion without further purification.

EXAMPLE 2

Preparation of Polymeric Chelate (ii)

(CHELATE C):
R$_2$=—OH, —Cl or

CH$_3$—N—CH$_2$(CHOH)$_4$CH$_2$OH;

n=40

(a) 19.5 Grams (0.1 mole) of N-methylglucamine is dissolved in 100 ml of water. To this solution is added 0.12 mole of polyepichlorhydrin (HYDRIN 10×1) DP-40; B. F. Goodrich Co., Cleveland, Ohio, a 20% excess) in 100 ml of toluene/methylene chloride (50/50, V/V). The system is allowed to stir vigorously for several hours at reflux temperature. The HCl produced is neutralized by the slow addition of aqueous sodium hydroxide. The aqueous polymeric chelate is used to bind boron without further purification.

(b) (CHELATE D):
R$_2$=—OH, —Cl or —NH—C(CH$_2$OH)$_3$; n=40

Similarly, as is described above in Example 2(a), the reaction is performed except that a stoichiometrically equivalent amount of tris(hydroxymethyl)methylamine is used instead of N-methylglucamine. There is obtained a corresponding amount of active polymer which is used to chelate boron ion without further purification.

EXAMPLE 3

Preparation of Polymeric Chelate (iii)

Based on Poly(methyl methacrylate)
(CHELATE E):
R$_3$=—OH or

CH$_3$N—CH$_2$—(CHOH)$_4$—CH$_2$OH, t=100

(a) Poly(methyl methacrylate)(86 g, equivalent to one mole of formula weight of the monomeric methylacrylate) is dissolved 300 ml of toluene, and 195 g of the N-methylglucamine (1 mole) is added slowly. The resulting solution is heated to 40°-50° C. for one hour and the toluene is evaporated under vacuum. The residue is taken up in 500 ml of water, and the solution which has the desired structure is used without further purification in subsequent experiments.

(b) CHELATE F):
R$_3$=—OH or —CH$_2$—CH(OH)—CH$_2$—NH—C(CH$_2$OH)$_3$, n=40

Similarly, as is described above in Example 3(a), the reaction is performed except that a stoichiometrically equivalent amount of tris(hydroxymethyl)methylamine epichlorhydrin is used in place of the N-methylglucamine adduct of epichlorhydrin. There is obtained a corresponding yield of active polymer which is used to chelate boron ion without further purification.

EXAMPLE 4

Preparation of Chelate (iv)

(CHELATE G):
R$_4$=—OH or

CH$_3$—N—CH$_2$—(CHOH)$_4$CH$_2$OH, y=100

(a) Polyvinylbenzyl chloride (15 g, equivalent to 0.1 mole of monomer units) is dissolved in 100 ml of methylene chloride, and 30 g of N-methylglucamine in 100 ml of water are added. The system is warmed to 40° C. and stirred vigorously for two hours. Sodium hydroxide is added obtain a pH of 9 or 10 to neutralize the HCl formed. The solution which has the desired structure is used without further purification in subsequent steps.

(b) (CHELATE H):
R$_4$=—NHC(CH$_2$OH)$_3$, n=100

Similarly, the reaction in Example 4(b) is run except that N-methylglucamine is replaced with a stoichiometrically equivalent amount of tris(hydroxymethyl)methylamine. The resulting solution is used without further purification.

EXAMPLE 5

Preparation of Chelate (v)

(CHELATE J):
R$_5$=—H or —CH$_2$CH(OH)CH$_2$—N(CH$_3$)—CH$_2$(CHOH)$_4$CH$_2$OH (a) Eighty grams of the polymer KYMENE 557 H (0.1 mole monomer equivalent from Hercules Corporation, Wilmington, Del.) a copolymer of adipic acid, diethylenetriamine and epichlorhydrin is added to a solution of 46 g of N-methylglucamine in about 200 ml of water, (more than a two fold excess) the solution is heated at 80° C. for two hours. The resulting solution which contained the desired polymer (Chelate J) is used without further purification in subsequent boron ion removal.

(b) (CHELATE K):
$R_5 = -H$ or $-NH-C(CH_2OH)_3$

Similarly, the reaction in Example 5(a) is repeated using a stoichiometrically equivalent amount of tris(hydroxymethyl)methylamine in place of N-methylglucamine. The resulting solution is used in chelation experiments in a similar manner.

EXAMPLE 6

(CHELATE L):
$-H$ or $R_6 = -CH_2-CH(OH)-CH_2-N(CH_3)CH_2(CHOH)_4CH_2OH$

A polymer solution is made by reacting equimolar quantities of methyl acrylate and ethylenediamine to produce the polymer backbone. To this aqueous solution is added an equivalent of N-methylglucamine as is described above in Example 2(a). The solution is heated at 80° C. for 2 hours and the resulting polymer is used in subsequent chelation experiments.

EXAMPLE 7

Preparation of Polymeric Chelate (vii)

(CHELATE M):
$R_6$ and $R_7 = -CH_2CH(OH)CH_2OH$; $R_8$ is $-CH_2CH(OH)-CH_2-N(CH_3)-CH_2(CHOH)_4-CH_2OH$ (a) Twenty-seven g (containing 50 mmole of amine nitrogen) of commercial polymer FIBRABON 35 (Diamond Shamrock Corporation, Cleveland, Ohio) were diluted to about 80 ml with water and then N-methylglucamine (19.5 g, 0.1-mole) was added. The reaction mixture was maintained at between 50° C. and 60° C. for about 3 hours while 6N sodium hydroxide was added to maintain the pH at about 10. The solution (about 100 ml) was freed of unreacted amine by washing in an ultrafiltration cell with about one liter of de-ionized water. By titration of the permeate with boric acid, a measure of the amine which permeated the cell membrane was obtained. It was estimated that about 36 mmol remained in the cell, presumably attached to the polymer.

EXAMPLE 8

Boron Removal from Aqueous Solution

Into a 60-ml ultrafiltration cell having a 13 cm$^7$ (10,000 molecular weight cutoff) membrane were placed 25 ml of solution of the polymer prepared in Example 7. An aqueous solution containing 11 mg of boron (as boric acid) per liter, 180 mg sodium chloride per liter, 120 mg of magnesium sulfate per liter, and 100 mg of potassium bicarbonate, having an overall pH of 7.4, was pumped through the cell under a pressure of 30 psi.

The permeate was collected at a flow rate of about 0.3 ml/min. A plot of the permeate volume versus boron concentration is shown in FIG. 2. Several hundred ml of essentially boron-free permeate were collected. After 2 liters of permeate had been collected, the boron level in the permeate was about the same level as the feed solution. The feed solution was then replaced by 1N hydrochloric acid. The conditions used to obtain the information in FIG. 2 includes a cell having a PM 10 membrane having a 10,000 molecular weight cutoff, 13.4 cm$^2$, 30 psi pressure, and flow rate 0.3 ml/min. The cell solution is 25 ml of 0.1M N-methylglucamine equivalent, at a pH of 7. Elution of all the boron was accomplished using about 140 ml of 1N hydrochloric acid at the same conditions as described in FIG. 3.

EXAMPLES 9, 10 and 11

Boron Removal from an Oil Well Brine

An oil well brine was analyzed for several constituents and was found to have the composition shown in Table 2 below:

TABLE 2

| OIL WELL BRINE | | |
|---|---|---|
| Constituent | mmole/l | mg/l |
| $HCO_3^-$ | 2.4 | 146 |
| RCOOH | 0.3 | |
| phenolic | 4 | |
| $Cl^-$ | 4.55 | 162 |
| Mg | 0.2 | 6.1 |
| Ca | 0.9 | 36 |
| Na | 9.1 | 210 |
| B | | 1.7 |
| pH ~7 | | |

Sulfate was present but was not determined.
RCOOH was assigned to those constituents having a titratable proton in the range of pK about 5 after removal of the carbon dioxide.
Phenolics were estimated from the titration curve with sodium hydroxide.
Boron was determined by the curcumin colorimetric method.

The apparatus used is shown in FIG. 1. The examples are run under the conditions generally described in Example 8. The feed solution is fed into the membrane cell under a pressure of 30 psig. The membrane is "polysulfone ultrafiltration membrane" (cutoff 10,000 daltons) and was used as a 4.3 cm diameter disc in an Amicon 43 mm stirred ultrafiltration cell. A volume of 25 ml of polymer solution FIBRABON 35/N-methylglucamine was used in which the concentration of attached NMG groups was about 0.02M. Permeate from the cell was collected on a fraction collector and samples were analyzed for boron. A pressure of 30 psig was maintained throughout each of three experimental runs.

Figure 4:
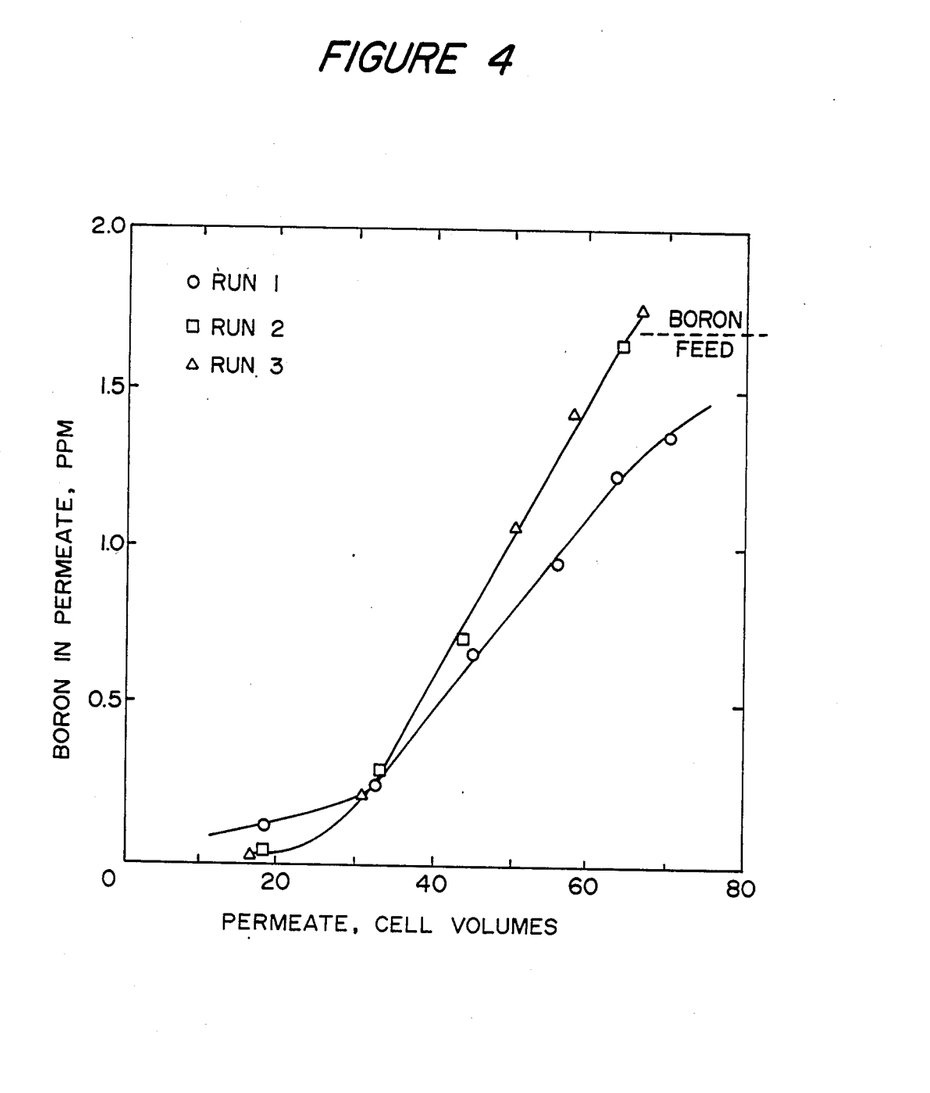
FIG. 4 shows boron removal from an oil well brine.

The data for Run 1, Run 2 and Run 3 as consecutive runs is shown in FIG. 4 cell contents: 25 ml of 0.02M N-methyl glucamine/Fibrabon 35; Membrane: polysulfone support (MW cutoff about 10,000; Pressure: 30 psig. After each absorption run, the loaded cell solution was made 0.5M in hydrochloric acid and allowed to concentrate to about 20 percent of its original volume. This procedure was repeated twice more to insure complete removal of the absorbed boron. The membrane was soaked in 0.1N sodium hydroxide overnight, and the cell contents were adjusted to neutral pH using dilute hydrochloric acid prior to beginning the feed brine for the next cycle. As FIG. 4 shows, boron absorption was quite similar for Run 1, Run 2 and Run 3. Boron absorption was about 2 mg for each run and eventually appeared in about three cell volumes of 0.5M hydrochloric acid at a concentration of about 30 ppm.

The permeation rates are shown in Table 3 below:

TABLE 3

| OPERATING DATA | | | | | |
|---|---|---|---|---|---|
| | Water Flow Rate (ml/min) | | | Average | Mg Boron |
| | Before Run | After Run$^b$ | After NaOH Treatment | Brine Flow | Ab-sorbed | Elut-ed |
| Run 1 | 2 | $a$ | 1.1 | 0.7 | 2.2 | 2.9 |
| Run 2 | 1.1 | 0.7 | 1.5 | 0.6 | 2.0 | 2.9 |
| Run 3 | 1.5 | 0.6 | 1.0 | 0.5 | 2.0 | $a$ |

$^a$not determined
$^b$flows are after regeneration step with acid

While some embodiments of the invention have been shown and described herein, it will become apparent to those skilled in the art that various modifications and changes can be made in the process to remove boron-containing ion from fluid streams using water-soluble polymeric organic chelates without departing from the spirit and scope of the present invention. All such modifications and changes coming within the scope of the appended claims are intended to be covered thereby.

I claim:

1. An improved cyclic process for removal of boron-containing ions from a fluid stream comprising boron-containing ions, which process comprises:

(A) contacting the fluid stream in a contacting zone with an aqueous reaction solution at between about 10° C. and 90° C. for a time sufficient to chelate the boron-containing ions, the reaction solution itself comprising an effective amount of water-soluble organic polymeric chelant selected from organic polymeric chelants of the formula:

$$-(CH_2-CH_2-N)_{\overline{n}}- \quad (i)$$
$$\phantom{-(CH_2-CH_2-}|$$
$$\phantom{-(CH_2-CH_2-}R$$

wherein R in each unit of the polymer is independently selected from —H or a substituent selected from:

wherein
$R_1$ is alkyl having from 1 to 10 carbon atoms; or

—CH$_2$—CH(OH)CH$_2$—NH—C(CH$_2$OH)$_3$;

and
n is an integer between about 5 and 20,000;

$$-(CH_2-CH-O-)_n \quad (ii)$$
$$\phantom{-(CH_2-}|$$
$$\phantom{-(CH_2-}CH_2-R_2$$

wherein $R_2$ in each unit of the polymer is independently selected from —OH, —Cl, or a substituent:

$R_1$—N—CH$_2$—CHOH—CHOH—CHOH—CHOH—CH$_2$OH wherein
$R_1$ is alkyl having from 1 to 10 carbon atoms; or

—NH—C(CH$_2$OH)$_3$;

and
n is an integer between about 5 and 20,000;

$$-(CH_2-CH)_{\overline{t}}- \quad (iii)$$
$$\phantom{-(CH_2-}|$$
$$\phantom{-(CH_2-}C=O$$
$$\phantom{-(CH_2-}|$$
$$\phantom{-(CH_2-}R_3$$

wherein $R_3$ in each unit of the polymer unit is independently selected from —OH, —OR'$_1$ or a substituent:

$R_1$—N—CH$_2$—CHOH—CHOH—CHOH—CHOH—CH$_2$OH wherein
$R_1$ and $R'_1$ are each independently alkyl having from 1 to 10 carbon atoms; or from OH$^-$ or a substituent

—NH—C(CH$_2$OH)$_3$;

and
t is an integer between about 10 and 20,000;

where
$R_4$ in each unit of the polymer unit is independently selected from —OH, —Cl, or a substituent:

$R_1$—N—CH$_2$—CHOH—CHOH—CHOH—CHOH—CH$_2$OH wherein
$R_1$ is alkyl having from 1 to 10 carbon atoms, or

—NH—C(CH$_2$OH)$_3$;

and
y is an integer between about 20 and 20,000;

wherein $R_5$ in each unit of the polymer is independently selected from —CH$_2$CH(OH)CH$_2$OH; —CH$_2$CH(OH)CH$_2$Cl; or wherein $R_1$ is alkyl having from 1 to 10 carbon atoms, or from —CH$_2$CH(OH)CH$_2$OH, —CH$_2$CH(OH)CH$_2$Cl or —CH$_2$CH(OH)CH$_2$—NH—C(CH$_2$OH)$_3$; wherein x is between about 10 to 10,000, a is 6, and b is 1 to 4;

$R_6$ in each polymer unit is independently selected from —H or wherein
R₁ is alkyl having from 1 to 10 carbon atoms, or from —H or —CH₂CH(OH)CH₂—NH—C(CH₂OH)₃;
m is 1 to 4, and x is 5 to 20,000;

wherein R₇, R₈, and R₉ in each polymer unit are each independently selected from R₅ as is defined hereinabove, and w is between about 10 and 10,000;

with the proviso that the overall ratio of H to substituent in R₁, —OH or —Cl to other substituent in R₂, —OH or OR′₁ to other substituent in R₃, —OH or —Cl to other substituent in R₄, —CH₂CH(OH)CH₂OH or —CH₂CH(OH)CH₂Cl to other substituent in R₅, H to other substituent in R₆, —CH₂CH(OH)CH₂OH or —CH₂CH(OH)CH₂Cl to other substituent in R₇, —CH₂CH(OH)CH₂OH or —CH₂CH(OH)CH₂Cl to other substituent in R₈, and —CH₂CH(OH)CH₂OH or —CH₂CH(OH)CH₂Cl to other substituent R₉ in each organic polymer chelant described hereinabove is between about 10/90 and 90/10 wherein the polymeric chelant has a molecular weight of between about 500 and 1,000,000 daltons;

(B) treating the aqueous solution produced in step (A) by first membrane separation means effective to remove water and other reaction products having a molecular weight of about 500 daltons from the aqueous solution and from a concentrated aqueous solution;

(C) contacting the concentrated aqueous solution produced in step (B) with a mineral acid under conditions effective to release the boron from the chelant and form a regenerated chelant;

(D) removing the released boron ion by second membrane separation means effective to separate the released boron ion and from said a concentrated aqueous solution including regenerated chelant;

(E) recycling the concentrated aqueous solution including said regenerated chelant from step (D) to the contacting zone of step (A).

2. The process of claim 1 wherein in step (B) the aqueous solution is concentrated by separation means selected from ultrafiltration and dialysis.

3. The process of claim 2 wherein the means is ultrafiltration.

4. The process of claim 3 wherein in step (D), the second means effective to separate boron ions is selected from ultrafiltration or dialysis.

5. The process of claim 4 wherein the second means is ultrafiltration.

6. The process of claim 2 wherein the organic polymeric chelant is:

7. The process of claim 6 wherein R₇, R₈, are selected from —CH₂CH(OH)CH₂OH; —CH₂CH(OH)CH₂Cl; and R₉ is —CH₂CH(OH)CH₂—N(CH₃)—CH₂—(CHOH)₄CH₂OH.

8. The process of claim 7 wherein the temperature of the process is between about 15° C. and 50° C.

9. The process of claim 7 wherein in step (D), the second means effective to separate boron ion is selected from ultrafiltration or dialysis.

10. The process of claim 6 wherein R₇, R₈ and R₉ are each independently selected from —CH₂CH(OH)CH₂OH, —CH₂CH(OH)CH₂Cl, or —CH₂CH(OH)CH₂—NH—C(CH₂OH)₃.

11. The process of claim 10 wherein in step (C) the pH of the solution after the addition of the mineral acid is between about 0 and 4.

12. The process of claim 6 wherein in step (C) the pH of the solution after the addition of the mineral acid is between about 0 and 4.

13. The process of claim 1 wherein in step (C) the mineral acid is selected from hydrochloric acid, nitric acid or sulfuric acid.

14. The process of claim 1 wherein in step (C) the pH of the solution after the addition of the mineral acid is between about 0 and 4.

15. The process of claim 1 wherein the organic polymeric chelant is polymer (i).

16. The process of claim 1 wherein the organic polymeric chelant is polymer (ii).

17. The process of claim 1 wherein the organic polymeric chelant is polymer (iii).

18. The process of claim 1 wherein the organic polymeric chelant is polymer (iv).

19. The process of claim 1 wherein the organic polymeric chelant is polymer (v).

20. The process of claim 1 wherein the organic polymeric chelant is polymer (vi).

* * * * *

UNITED STATES PATENT AND TRADEMARK OFFICE
CERTIFICATE OF CORRECTION

PATENT NO. : 4,755,298

DATED : July 5, 1988

INVENTOR(S) : Robert R. Grinstead

It is certified that error appears in the above-identified patent and that said Letters Patent is hereby corrected as shown below:

Title page:

In "References Cited" delete "4,405,576 9/1986" and insert -- 4,405,576 9/1983 --;

In the ABSTRACT, line 3, delete "in" and insert -- is --;

Col. 1, line 40, delete "is" and insert -- in --;

Col. 1, line 43, delete "on" and insert -- in --;

Col. 4, line 16, delete "subsituent" and insert -- substituent --;

Col. 5, line 24, after "weight" insert -- of --;

Col. 6, line 37, delete "or" and insert -- as --;

Col. 7, line 4, delete "in" and insert -- by --;

Col. 7, line 60, after "preferably" insert -- about --;

Col. 9, line 13, delete "maintain" and insert -- maintaining --;

Col. 10, line 42, after "added" insert -- to --;

Col. 11, line 45, delete "13 $cm^7$" and insert -- 13 $cm^2$ --;

Col. 11, line 50, "sulfate" has been misspelled;

Col. 11, line 64, delete "0.3 ml/min." and insert -- 0.3 ml/mm. --;

UNITED STATES PATENT AND TRADEMARK OFFICE
CERTIFICATE OF CORRECTION

PATENT NO. : 4,755,298

DATED : July 5, 1988

INVENTOR(S) : Robert R. Grinstead

It is certified that error appears in the above-identified patent and that said Letters Patent is hereby corrected as shown below:

Col. 12, line 27, after "is" insert -- a --;

Col. 12, line 38, delete "of";

Col. 13, line 67, delete "-OR $_1$" and insert -- -OR$^1_1$ --;

Col. 14, line 4, delete "R$_1$-N-CH$_2$-CHOH-CHOH-CHOH-CHOH-CH$_2$OH" and insert -- R$^1_1$-N-CH$_2$-CHOH-CHOH-CHOH-CHOH-CH$_2$OH --;

Col. 15, line 44, "form" has been misspelled;

Col. 15, line 52, delete "said";

Col. 15, line 53, after "including" insert -- said --;

Col. 16, line 7, delete "ions" and insert -- ion --.

Signed and Sealed this

Eleventh Day of July, 1989

Attest:

DONALD J. QUIGG

Attesting Officer

Commissioner of Patents and Trademarks